United States Patent [19]
Andersen

[11] Patent Number: 5,597,202
[45] Date of Patent: Jan. 28, 1997

[54] SLUNG FABRIC BICYCLE SEAT

[76] Inventor: Scott Andersen, 14959 Riverside North, Marine on St. Croix, Minn. 55047

[21] Appl. No.: 377,693

[22] Filed: Jan. 25, 1995

Related U.S. Application Data

[63] Continuation-in-part of Ser. No. 184,843, Jan. 21, 1994, abandoned.

[51] Int. Cl.$^6$ .................................................. B60N 2/38
[52] U.S. Cl. .................... 297/195.1; 297/205; 297/207; 297/284.2
[58] Field of Search .................... 297/195.1, 204, 297/205, 207, 214, 219.11, 284.2, 452.13

[56] References Cited

U.S. PATENT DOCUMENTS

| | | |
|---|---|---|
| 252,971 | 1/1882 | Rintelman . |
| 253,504 | 2/1882 | Burley . |
| 323,693 | 8/1885 | Lamplugh . |
| 492,375 | 2/1893 | Steers . |
| 512,008 | 1/1894 | Cavanaugh . |
| 515,966 | 3/1894 | Pepper . |
| 578,426 | 3/1897 | Smith . |
| 605,689 | 6/1898 | Kirkpatrick . |
| 606,146 | 6/1898 | Hunt . |
| 610,960 | 9/1898 | Chapman . |
| 612,546 | 10/1898 | Leimburg . |
| 2,395,346 | 2/1946 | Schwinn . |
| 3,989,296 | 11/1976 | Naka . |
| 4,099,769 | 7/1978 | Jacobs . |
| 5,356,198 | 10/1994 | Hughes ............................. 297/195.1 |

FOREIGN PATENT DOCUMENTS

| | | |
|---|---|---|
| 819647 | 10/1937 | France . |
| 68836 | 2/1930 | Sweden ............................. 297/195.1 |
| 710400 | 6/1954 | United Kingdom . |

*Primary Examiner*—Laurie K. Cranmer
*Attorney, Agent, or Firm*—Haugen & Nikolai, PA

[57] ABSTRACT

A bicycle seat having a single piece of fabric slung across a frame member and resembling a hammock. The fabric is drawn taut and resides generally in a single plane. In contrast to a saddle seat which requires one to straddle one's buttocks across a small padded seat with weight unevenly distributed thereon, the present invention forms a sling to evenly support the weight of the rider across a large surface area. The fabric has an elongated sleeve at one end which is threaded over the frame, and can be easily removed therefrom for washing or replacement. The frame is comprised of a single rod formed into an upwardly extending triangular frame. An adjusting mechanism at the proximal end of the seat can be adjusted to effect the tautness of the fabric. A conventional coupling clamp is implemented to couple the seat frame to a conventional bicycle. With the large, planar, weight supporting surface, one can enjoy a more comfortable ride without the discomfort created by conventional seats, and will not be sore thereafter.

4 Claims, 6 Drawing Sheets

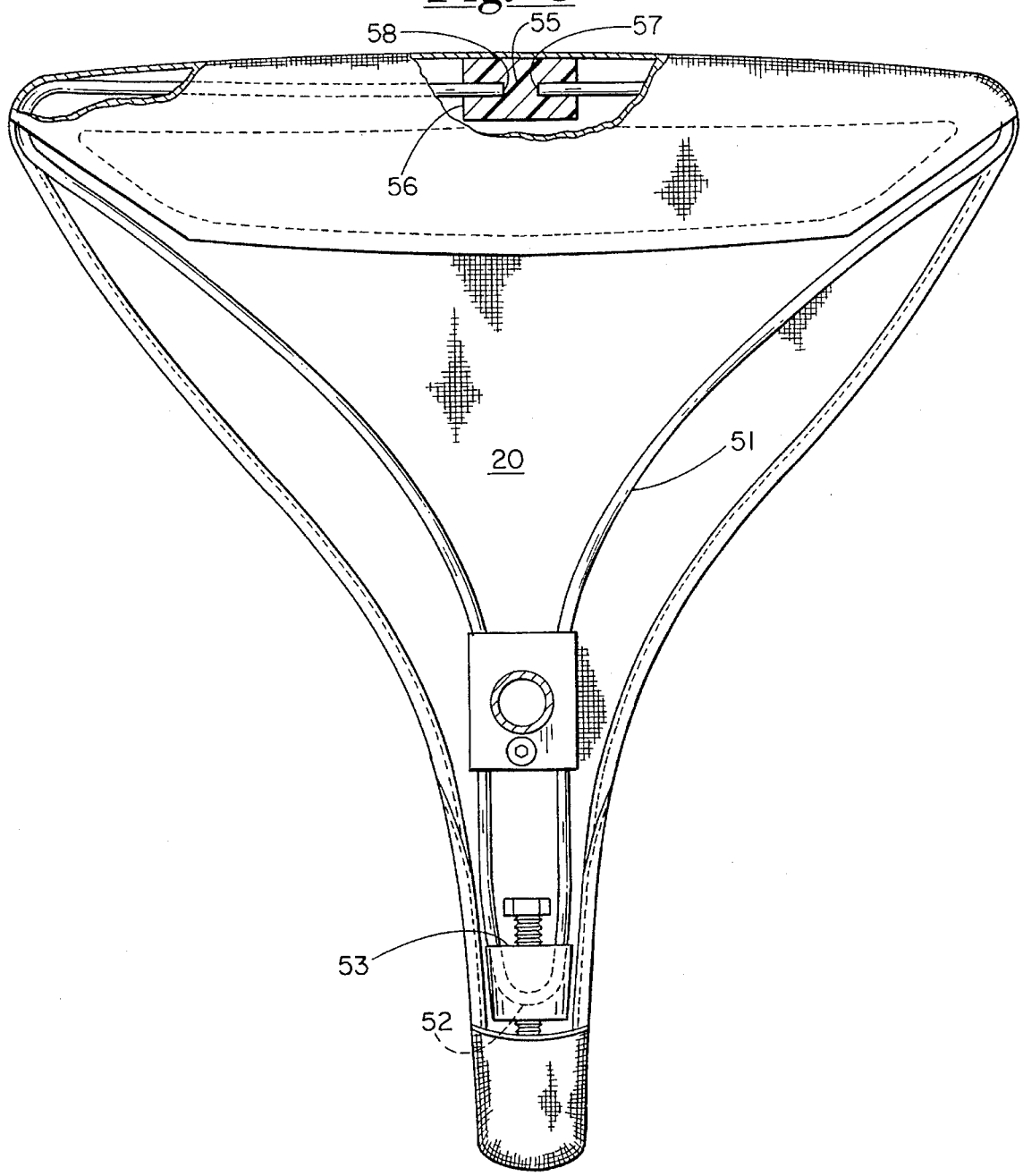

SLUNG FABRIC BICYCLE SEAT

CROSS-REFERENCE TO RELATED APPLICATION

This is a continuation-in-part of my application Ser. No. 08/184,843, filed Jan. 21, 1994, now abandoned, and entitled "SLUNG FABRIC BICYCLE SEAT", now abandoned.

CROSS REFERENCE TO INVENTION DISCLOSURE DOCUMENT

Cross reference is made to Invention Disclosure Document 341891 submitted on Oct. 29, 1993.

BACKGROUND OF THE INVENTION

I. Field of the Invention

A bicycle seat configured to comfortably support a bicyclist.

II. Discussion of the Prior Art

Bicycle seats have been around for many years, and for many years, have been the primary source of discomfort for the bicyclist. This is because most bicycle seats are configured as "saddles". Typically, these saddles are padded, and are adapted to be straddled by the rider. These saddles are provided with little surface area to comfortably support the buttocks of the bicyclist. Further, they are typically designed and padded such that the rider's weight is concentrated on small portions of the buttocks while straddling the saddle.

One of the principle reasons people name as to why they refrain from riding a bike is the discomfort they encounter while riding the bike, and after a bike ride. Many people also indicate they would be more inclined to ride a bicycle if the seat was more comfortably designed. While it would be impractical to design a lounge chair upon a bicycle, prior art bicycle seats which have been designed for the last 100 years have generally had the basic triangular padded saddle arrangement.

U.S. Pat. No. 2,395,346 to Schwinn is a good representation of the typical bicycle seat. It comprises a padded or foamed material, stretched and convexly curved about a frame. It has a small upper surface area, and thus, the rider's weight is typically concentrated unevenly, and on small portions of the rider's buttocks. Thus, the principle sources of discomfort for the rider reside in the small weight-supporting surface area, and the convex curvature of the seat giving it a "saddle" shape.

Some bicycle saddles have been designed to provide a more comfortable sitting, such as U.S. Pat. No. 3,989,296 to Naka. This device also comprises a saddle having a rather small weight-supporting surface area, and has a curved supporting surface with downwardly curved lateral surfaces. This device has a twisted wire frame which is elastically mounted on the bicycle to provide a cushioning effect. Screws are used to secure the cover to the forward and rear end of the frame. Thus, while a more cushioned ride is attempted to be provided, this device still suffers in that a small, curved, surface area is provided for one's buttocks. Accordingly, the rider's weight will be unevenly concentrated on small portions thereof. This provides the rider with a somewhat uncomfortable ride, and sore buttocks after the ride is completed. The cover is perforated to accept the mounting screws, and cannot be quickly removed from the frame for washing.

Still other devices are shown which attempt to provide a more cushioned effect, such as saddles disclosed in U.S. Pat. No. 578,426 to Smith, and No. 610,960 to Chapman. Both of these saddles are comprised of a plurality of cords extending between the front and rear of the saddle frame. The rear portion of each saddle is bowed downwardly and has a convex shape. Both of these saddles have a rather narrow rear surface for supporting a rider's buttocks. Another device is disclosed in U.S. Pat. No. 606,146 to Hunt. This device is also comprised of a saddle with a plurality of laces or strips extending between a midsection of the saddle and the rear thereof. These strips are threaded through corresponding holes in the rear of the frame. A separate cover is provided which is attached to the saddle using screws.

Yet another saddle is disclosed in U.S. Pat. No. 253,504 to Burley. This saddle includes a plurality of leather straps threaded through slots in the forward and rear ends of the frame, and are drawn taut. One or more buckles are provided for connecting the ends of the strap(s). Thus, a series of spaced, independent straps are provided. Each of the plurality of straps supports the rider's weight independently from the other. Thus, the middle straps are adapted to support a majority of the rider's weight, and independently of the outermost straps. The spacings between the straps are provided for ventilation. However, this feature can cause an uncomfortable ride if the straps should bind in the crotch of the rider.

OBJECTS

It is accordingly a principle object of the present invention to provide a comfortable bicycle seat which provides a substantially improved and more comfortable ride than bicycle saddles currently available.

A further object of the present invention is to provide an improved bicycle seat which comfortably supports the buttocks of the rider, such that the rider's weight is not unevenly concentrated on small portions of the rider's buttocks.

Another object of the present invention is to provide an improved bicycle seat having the characteristic of being a seat, in contrast to a rounded saddle which is straddled by the rider.

Still yet a further object of the present invention is to provide an improved bicycle seat which can be easily, and inexpensively manufactured, and which can accommodate and conform to riders having either small or large buttocks. To meet the needs of these objects, the following improved bicycle seat is disclosed and discussed in great detail in the following description and the accompanying drawings.

SUMMARY OF THE INVENTION

The foregoing objects and advantages of the present invention are achieved by providing an improved bicycle seat configured like a hammock. More specifically, a single piece of material is slung between a forward and rearend of a frame to evenly support and distribute the weight of the rider. Accordingly, a comfortable seat providing the feeling of a hammock, or a director's chair, is realized, in contrast to the conventional saddle with lateral surfaces curved downwardly and adapted to be straddled.

Specifically, the preferred embodiment of the present invention includes a rigid frame extending from a forward end and curved upwardly to a distal end thereof. A single piece of fabric is slung between the proximal and distal ends of this frame. The fabric resides in one plane, with the entire material being drawn taut between the frame, and supported above the frame midsection. Accordingly, when one sits on the seat, one's weight is evenly distributed across a large surface area of the slung fabric.

The fabric has a generally triangular shape, with the apex positioned at the proximal end of the frame. The distal end of the fabric is rather wide, preferably having a width of about 12 inches, but could be less. Accordingly, the present invention is configured as a seat which one can comfortably sit upon, rather than straddle. The slung fabric is preferably comprised with an integral elongated sleeve along the distal end thereof. This sleeve is formed by stitching, and can be easily threaded about the frame during assembly. Moreover, this fabric can be easily and quickly disassembled from the frame due to the sleeve feature, and washed. The proximal end of the fabric has an integral pocket formed by stitching and adapted about a forward adjustable protrusion. This protrusion can be longitudinally adjusted with respect to the frame by a bolt to draw the fabric taut, or loosened to facilitate disassembly to interchange, or wash the fabric. The fabric can be detailed with designs, which designs can be printed thereon, sewn thereon, etc. The wire frame is rigid, but has a slightly resilient feature once adapted to the bicycle mounting post with the slung fabric supporting the rider. Thus, a comfortable, cushioned seat is provided.

While the prior art has conventionally provided bicycle seats configured as saddles which are adapted to be straddled, the present invention is configured as a sling with fabric slung between the frame. Most people can appreciate the comfortable feel of a "hammock" like seat, in contrast to a saddle. During private studies of the present invention, the participating individuals have raved about how comfortable this hammock-like seat is, especially in contrast to conventional saddle seats with a small and curved weight supporting surface. Even with a cursory view of the present invention, one appreciates the significant differences and advantages of the present invention over the prior art.

BRIEF DESCRIPTION OF THE DRAWINGS

FIG. 6 is a bottom view of the slung bicycle seat similar to FIG. 3 and illustrating the alternative embodiment of FIG. 5.

Other objects, features and advantages of the present invention will become apparent to those skilled in the art through the Description of the Preferred Embodiment, Claims, and drawing herein.

DESCRIPTION OF THE PREFERRED EMBODIMENT

Figure 1:
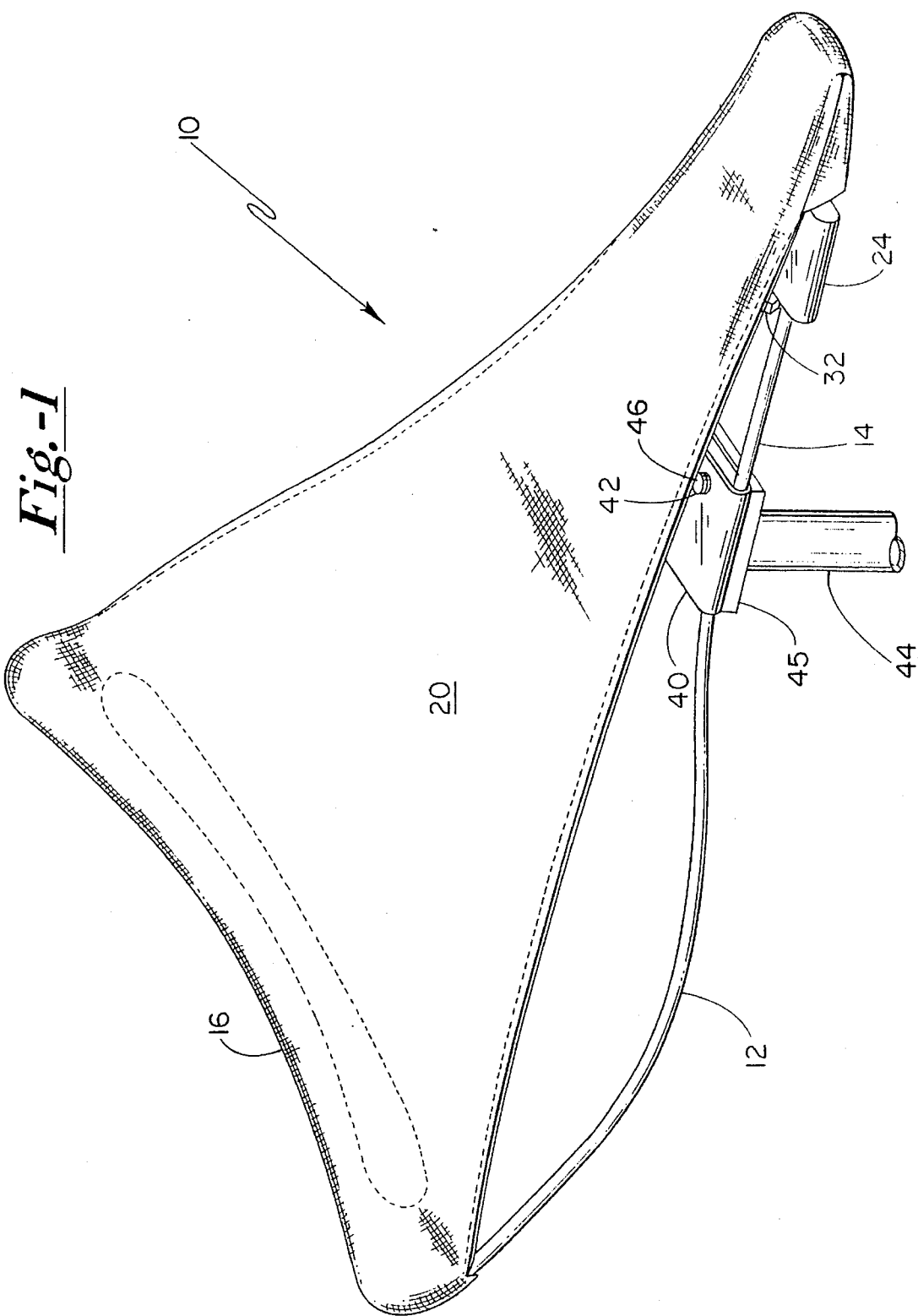
FIG. 1 is a perspective view of a slung bicycle seat having a single piece of fabric slung between opposing ends of a framed and forming a single plane which is angled slightly from front to back once adapted to a bike.

Referring now to FIG. 1, a bicycle seat according to the preferred embodiment of the present invention is generally shown at 10. Seat 10 is shown to include a rigid frame 12, formed from a bent rigid rod to provide a curved and triangular dish-shaped frame. A pair of proximal ends 14 of frame 12 are defined parallel to, and closely proximate with each other, at the apex of the frame. The widened distal end 16 of frame 12, forming the base of a triangle, is elevated above the plane which proximal ends 14 reside in. The frame segment at the distal end 16 is curved downwardly and inwardly towards the center of frame 12. This creates a unique concave seat when sat upon. However, the distal end segment 16 could also linearly extend between the opposing distal corners of frame 12 if desired.

Figure 2:
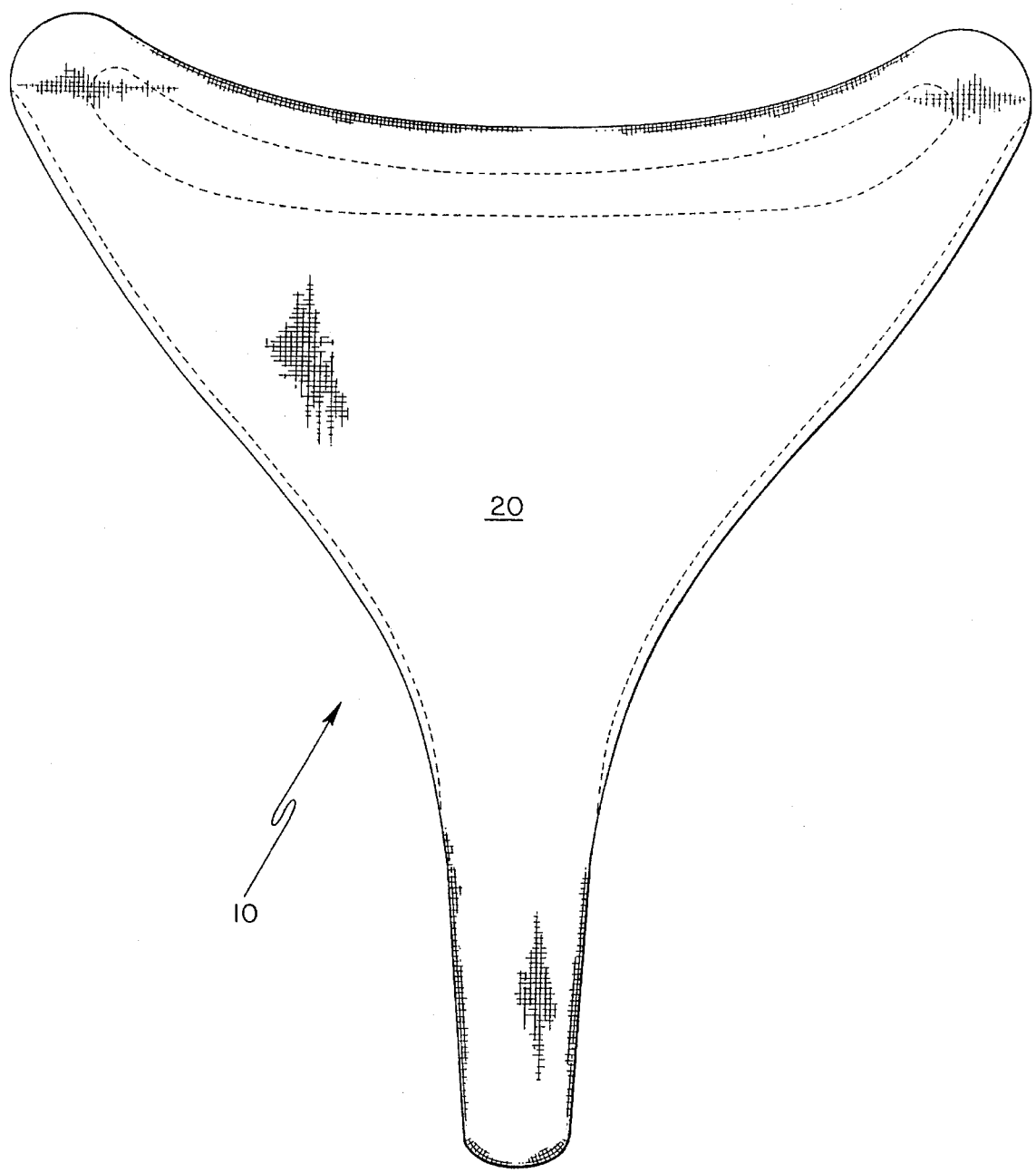
FIG. 2 is a top view of the slung bicycle seat in FIG. 1.

Seat 10 is further seen to include a single triangular piece of fabric 20 slung between the proximal end 14 and the distal end 16 of frame 12 (see FIG. 2). Fabric 20 is drawn taut therebetween such that fabric 20 is supported spatially above frame 12 at a midsection thereof. With fabric 20 slung between the opposing ends of frame 12, it takes on the general appearance of a hammock. The distal end of fabric 20 and frame 12 is rather wide, and preferably about 12 inches in width, but could be more or less. This distal end has an elongated sleeve 21 formed via stitching. The proximal end of fabric 20 is formed into a pocket 22 via stitching.

Figure 3:
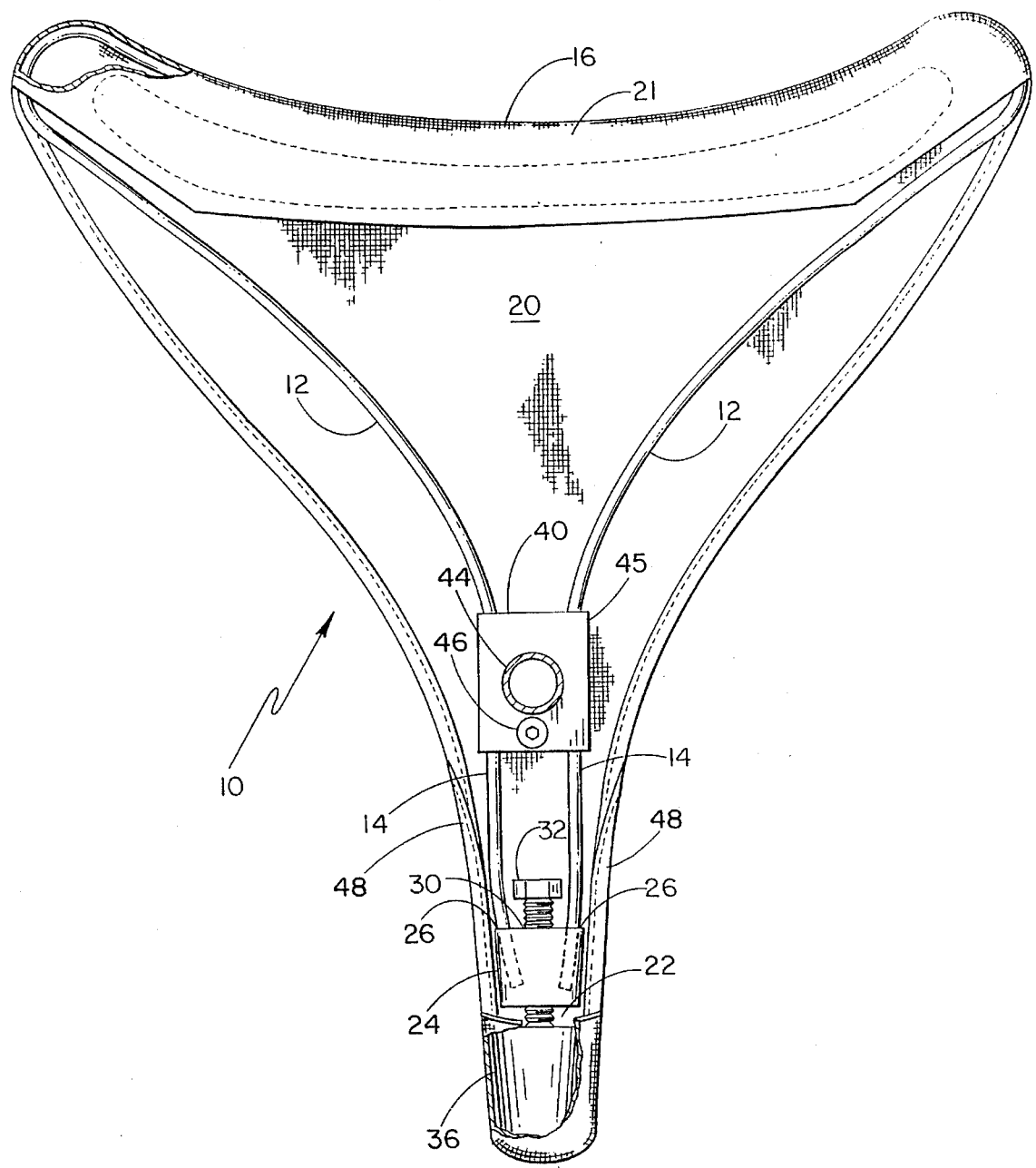
FIG. 3 is a bottom view of the slung bicycle seat adapted to a conventional bike post.

Referring to FIG. 3, an rigid adjustment member 24 having an elliptical cross section is slidingly coupled to the distal ends 14 of frame 12. Specifically, member 24 has a pair of cylindrical recesses 26 defined in the distal end thereof for frictionally receiving the proximal ends 14 of the frame. Member 24 also has a threaded opening 30 extending axially therethrough. This opening threadingly receives a tension adjusting bolt 32 axially disposed therethrough. A domed-shaped member 36 is axially connected to the distal end of bolt 32. Member 36 is received in the pocket 22 defined at the proximal end of fabric 20, as shown sleeve 21 is disposed about and supported by frame distal end 16.

To draw fabric 20 taut, bolt 32 is rotated and thus extended through coupling 24 to extend member 36 outwardly. To facilitate removal or interchanging of fabric 20, bolt 32 is rotated counterclockwise, thus retracting bolt 32 such that member 36 can be removed from pocket 22. Thereafter, coupling 24 can be removed from the distal ends 14 of frame 12. Thereafter, fabric 20 can be removed by sliding the sleeved portion 21 along frame 12 and over one end 14. Fabric 20 can be replaced and readapted thereto by implementing the reverse procedure.

Figure 4:
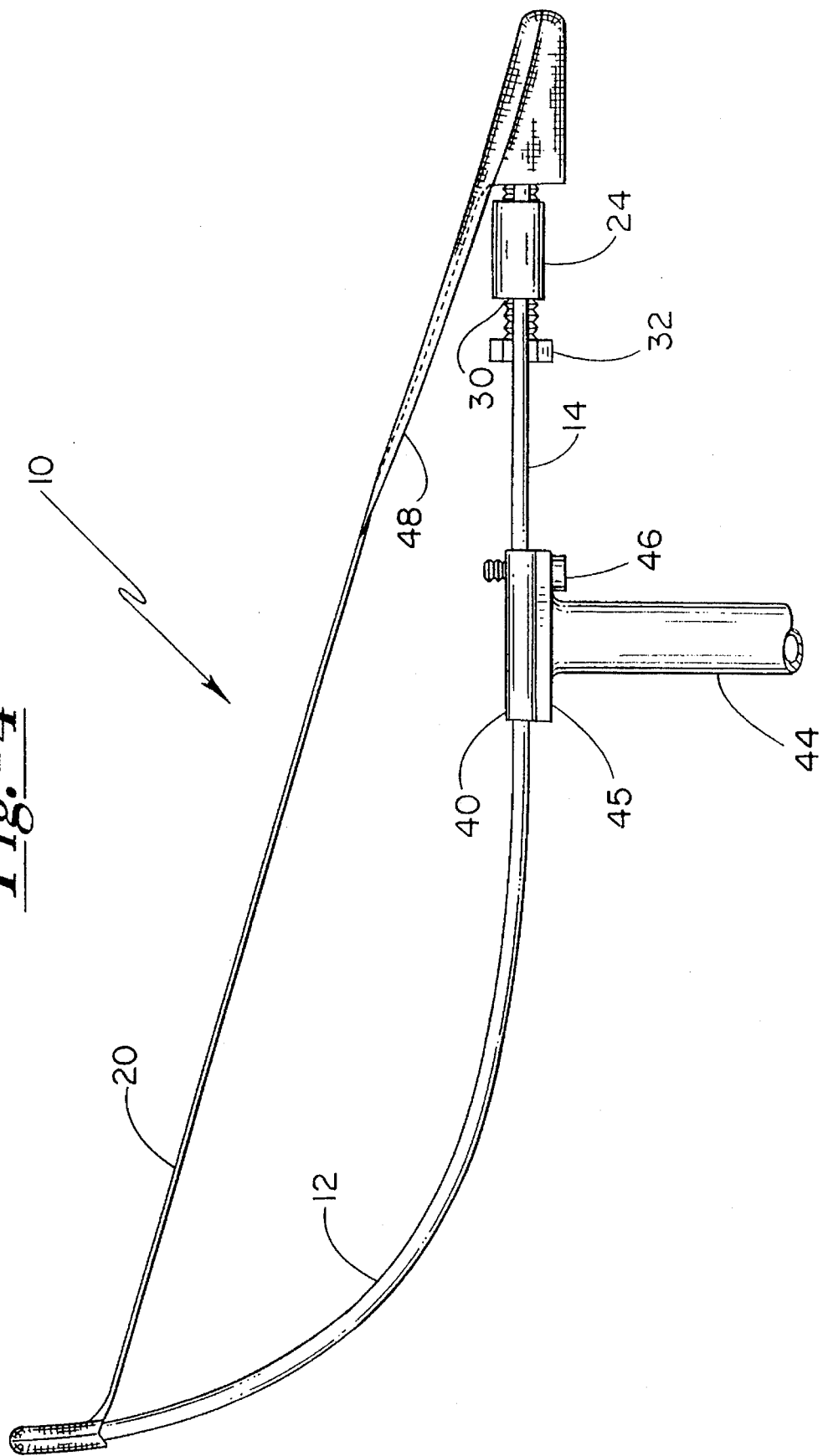
FIG. 4 is an end view of the slung bicycle seat adapted to the bike post wherein the fabric is angled front-to-back, and curved about the proximal end.

Referring to FIG. 4, a clamping bracket 40 is provided can be clamped over the midsection of frame 12 for facilitating adapting seat 10 to a conventional bike post. Clamp 40 is well known in the art, and includes a threaded opening 42 defined through the midsection thereof. An upward projecting bike post 44 forms a lower cradle portion 45, that clamp bracket 40 is secured thereto and upon with a bolt 46. Accordingly, the seat of the present invention can be easily and quickly adapted to a bike in a conventional manner.

As can be appreciated in FIG. 4, fabric 20 is comprised of a single piece of material slung from member 36 to the distal end 16 of frame 12. When drawn taut by using the adjusting arrangement at the proximal end of the seat frame, the large upper surface of fabric 20 resides in a single plane. This plane is preferably angled upwardly from front-to-back with respect to bike post 44, as shown. One of the principle features of the present invention is that when a rider seats oneself upon slung fabric 20, a hammock-like arrangement and the associated comfort is realized. The weight of the rider will be evenly distributed upon the large planar supporting surface of fabric 20. Therefore, one's weight will not be unevenly concentrated on small portions of one's buttocks as the prior art provides.

The rider will appreciate that the present invention is a seat, rather than a saddle. Seat 10 is so comfortable because it is comprised of a single piece of taut material and cannot bind in one's crotch, which can result from prior art seats having a plurality of straps. Fabric 20 forms a comfortable sling to support the rider's buttocks. In use, the central portion of fabric 20 will become slightly convex as frame 20 yields slightly. This is due to the inward and downward curved shape of the frame distal end 16, and further, due to the pocket 22 being narrower in width at the bottom than at the top (see FIG. 3). This pocket 22 shape causes the fabric to roll downward on the edges at 48 as tension is applied, through manual tensioning, or by sitting on the seat (see FIGS. 1 and 4). This rolling of the fabric also allows the rider's legs to slide more easily past the seat while pedaling. At the same time, the frame distal end 16 causes the larger area of fabric 20 to curve in a concave fashion, which cradles the rider's buttocks in comfort. The point 48 at which these two curves meet forms a reverse roll at about where the rider's legs bend while pedaling. This overall design and feature provides an exceptionally comfortable seat. Accordingly, the supporting surface of fabric 20 will conform to the rounded curvature of one's buttocks, which further facilitates a comfortable ride.

Sleeve 21 provides two features. First, it allows a quick and easy assembly and disassembly of fabric 20 from frame 12 for replacement or washing. Secondly, sleeve 21 is coupled to the frame distal end 16 along the entire length thereof, and accordingly, provides a fastening attachment point along the entire length thereof. Thus, when one sits on fabric 20, fabric 20 is supported along the entire length of distal end 16. Thus, fabric 20 will not become wrinkled or bind in the crotch of the rider. Further, the rider's weight is evenly distributed along the sleeve 21. Therefore, fabric 20 will not be subject to tearing away from frame 12. Water resilient polyester is the preferred material for fabric 20.

Figure 5:
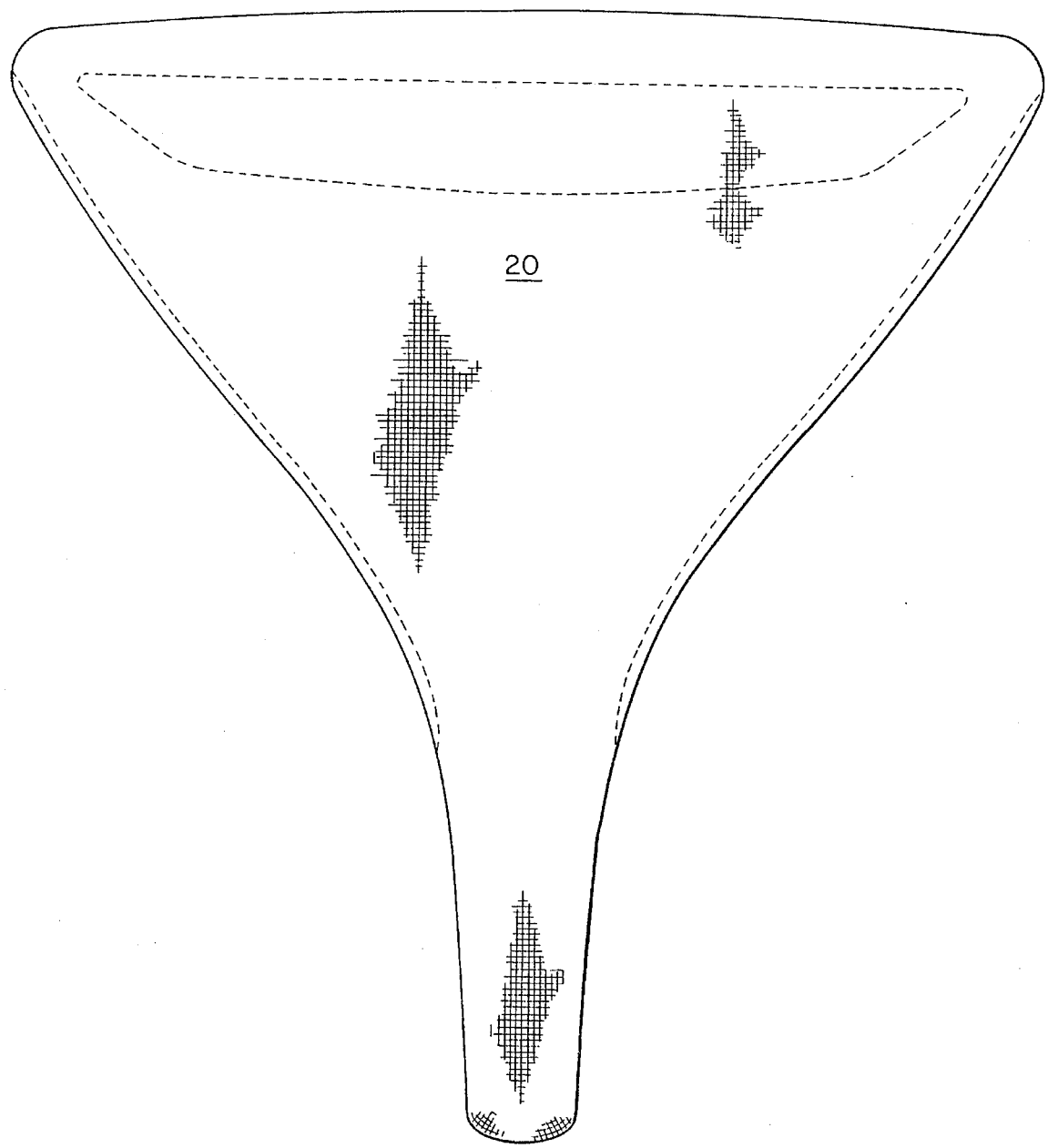
FIG. 5 is a top view of the slung bicycle seat similar to FIG. 2 and illustrating an alternative embodiment.

With attention being directed to FIGS. 5 and 6 and the embodiment illustrated in FIGS. 5 and 6, it will be noted that the frame 51 is modified in form from that illustrated in the embodiment of FIGS. 1–4. Specifically, and in particular, the forward end of the frame is in a single piece, as at 52, with a radiused segment 53 disposed therebetween. A nose-piece 53 is provided which has an opening, such as a concave opening formed generally along the central or longitudinal axis thereof to permit the nosepiece to grip the entire front end portion of the spring frame 52 therein for a purpose to be described hereinafter. Nosepiece 53 is held in place in the same fashion as in the embodiment of FIGS. 1–4, by the bolt as illustrated. At the rear portion of the seat, a break or discontinuity in the frame 51 is illustrated as at 55, with a plastic sleeve or other ferrule member 56 being utilized to slidably engage and retain the end segments 57 and 58 in axial alignment.

In actual operation, it has been found that this frame arrangement provides torsional support at the front end 52, and eliminates any tendency of the frame to sag laterally as the rider operates the bicycle. In other words, the stability of the seat is enhanced by this frame arrangement.

The nosepiece of the invention is designed to grippingly engage the spring member which is inserted into a concave opening formed in the nosepiece. Thus, the opening is both elongated in its depth and concave so as to achieve the combined goal of resisting deflection of the forward portion of the frame, and at the same time, provide for longitudinal adjustment to maintain a mechanical biasing force on the fabric portion of the seat.

Additionally, whenever it is desirable to remove the fabric portion from the seat member, the ferrule may be slid axially to permit the frame to be split along its rear, and at the same time the nosepiece may be permitted to slide toward the center of the seat, thereby relieving any stresses in the fabric member and at the same time, permitting removal of the fabric member.

Accordingly, with respect to the alternative embodiment illustrated in FIGS. 5 and 6, the structure comprises an elongated rod which is formed as a one-piece segment with proximal and distal ends. The rod is configured with its ends joined in axially aligned relationship along said distal end by the ferrule 56. The nosepiece 53 is positioned at the proximal end of the rod configuration, with the nosepiece having a cavity formed therein for grippingly engaging the proximal end of the rod frame.

In summary, an improved bicycle seat is provided having a single piece of uniquely slung fabric to comfortably support the rider. In contrast to a saddle, the seat has a generally planar supporting surface and has a wide weight-supporting distal end. The fabric can be easily interchanged and removed from the frame due to the sleeved portion. In use, the rider will appreciate the exceptionally comfortable hammock-like features of the present invention. Even upon a cursory review, the present invention is marketably different from those saddle bicycle seats of the prior art.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

I claim:

1. A bicycle seat, comprising:

(a) a frame member extending from a proximal end to a distal end with a midsection therebetween, with the midsection lying along a predetermined plane, said distal end extending upwardly from the plane of the midsection of the frame; and (b) a single piece of flexible fabric slung between and secured to both said frame proximal end and said distal end, said flexible fabric being drawn taut to define a bicycle seat supporting surface disposed between lateral edges and with the bicycle seat supporting surface lying entirely in a single plane and extending above the plane of said frame midsection, said fabric seat supporting surface having a generally triangular shape with the base portion thereof defining the distal end, and with the two sides of the triangular shape defining the lateral edges of said bicycle seat supporting surface, and with the apex of the triangle defining the proximal end, said bicycle seat supporting surface being freely suspended over said frame midsection with said two sides being elevated thereover;

(c) the arrangement being such that said tautly drawn flexible fabric defines said bicycle seat supporting surface and wherein said bicycle seat supporting surface is disposed in elevated spaced relationship over said frame midsection;

(d) said frame comprises an elongated rod, with said rod extending laterally at the frame distal end and with said frame distal end supporting the entire length of the base portion of said triangularly shaped tautly held flexible fabric;

(e) wherein said flexible fabric base portion has an elongated sleeve formed integrally therewith and adapted to slidably and releasably receive said frame rod to support said slung fabric along said frame distal end;

(f) wherein said frame further includes an adjustable attachment member at said proximal end, said fabric apex being formed into an attachment member receiving pocket and adapted to receive said frame proximal end therewithin, said attachment member facilitating drawing said slung flexible fabric taut when in extended disposition, and loosening said flexible fabric tautness when in retracted disposition to facilitate removing said flexible fabric from said frame; and (g) wherein said pocket is greater in width at the top than at the bottom so as to cause said flexible fabric to roll inwardly about itself at its edges at said apex when drawn taut.

2. A bicycle seat, comprising:

(a) a frame member extending from a proximal end to a distal end with a midsection therebetween, with the midsection lying along a predetermined plane, said distal end extending upwardly from the plane of the midsection of the frame; and (b) a single piece of flexible fabric slung between and secured to both said frame proximal end and said distal end, said flexible fabric being drawn taut to define a bicycle seat supporting surface disposed between lateral edges and with the bicycle seat supporting surface lying entirely in a single plane and extending above the plane of said frame midsection, said fabric seat supporting surface having a generally triangular shape with the base portion thereof defining the distal end, and with the two sides of the triangular shape defining the lateral edges of said bicycle seat supporting surface, and with the apex of the triangle defining the proximal end, said bicycle seat supporting surface being freely suspended over said frame midsection with said two sides being elevated thereover;

(c) the arrangement being such that said tautly drawn flexible fabric defines said bicycle seat supporting surface and wherein said bicycle seat supporting surface is disposed in elevated spaced relationship over said frame midsection;

(d) said frame comprises an elongated rod, said rod extending laterally at the frame distal end and with said frame distal end supporting the entire length of the base portion of said triangularly shaped tautly held flexible fabric;

(e) said flexible fabric base portion has an elongated sleeve formed integrally therewith and adapted to slidably and releasably receive said frame rod to support said slung fabric along said frame distal end; and (f) said frame further including an adjustable attachment member at said proximal end, said fabric apex being formed into an attachment member receiving pocket and adapted to receive said frame proximal end therewithin, said attachment member facilitating drawing said slung flexible fabric taut when in extended disposition, and loosening said flexible fabric tautness when in retracted disposition to facilitate removing said flexible fabric from said frame.

3. The seat as specified in claim 2 wherein said frame is comprised of a single piece of elongated rigid material formed into an upwardly-bowed triangle having a base and an apex, said rigid material having a pair of ends disposed adjacent to one another at the proximal end of said frame.

4. The bicycle seat as specified in claim 2 wherein said frame distal end is bowed inwardly along its midsection toward the central axis of said bicycle seat.

* * * * *